3,411,875
PROCESS FOR THE PRODUCTION OF
ANHYDROUS HYDROSULFITES
Yoshio Yoshikawa, Heizo Okazaki, and Takaaki Yamaguchi, Tokyo, Japan, assignors to Mitsubishi Edogawa Kagaku Kabushiki Kaisha, Chiyoda-ku, Tokyo, Japan, a corporation of Japan
No Drawing. Filed Apr. 1, 1965, Ser. No. 444,833
Claims priority, application Japan, Apr. 8, 1964, 39/19,694
2 Claims. (Cl. 23—116)

The present invention relates to a process for the preparation of anhydrous alkali metal hydrosulfites or hyposulfites by the use of alkali metal formate.

An object of the invention is to provide an improved process for the production of anhydrous alkali metal hydrosulfite of high stability and purity by adding dropwise sulfur dioxide-containing methanol and an alkaline agent to an aqueous solution of an alkali metal formate.

The present inventors previously invented a process for preparing anhydrous hydrosulfites of high purity comprising carefully adding dropwise a formic acid component to a methanol solution containing sulfur dioxide under acidic conditions, for the purpose of providing a simple and commercially advantageous method.

However, as a result of further research, the present inventors have found that anhydrous hydrosulfite of higher than 90% in purity is obtained in better yield than the above-mentioned previous invention without any precise temperature control by effecting the dropwise addition in an opposite manner to the previous invention.

While it is desired to produce hydrosulfites of high stability, the water of crystallization, when involved in a crystal of an alkali metal hydrosulfite, acts as a decomposition-promoting agent. It is accordingly preferred to have the product in anhydrous form. In known processes for producing sodium hydrosulfite which employ sodium formate as a starting material, the product is subject to decomposition when the starting materials are in certain molar ratios, as self-decomposing sodium hydrosulfite:

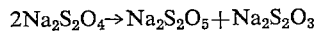

or air oxidizing sodium hydrosulfite:

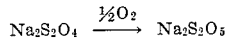

readily occurring in such products. Also in the known processes, the crystals having water of crystallization are usually occluded within the dehydrated crystals and render the whole product unstable. As is clear from above, the products prepared by the prior art methods are apt to be unstable.

According to the process of this invention it is possible to produce the anhydrous product of high stability directly from the methanol solution at a temperature above the dehydration point of a hydrated alkali metal hydrosulfite such as $Na_2S_2O_4 \cdot 2H_2O$.

It is known to prepare hydrosulfites by introducing gaseous sulfur dioxide into a mixture of sodium formate and sodium bisulfite in aqueous ethanol. However, this method gives a product of lower stability and purity, and requires a large amount of expensive ethyl alcohol so that it is commercially of little value. Thus, U.S. Patent No. 2,010,615 discloses a method of producing anhydrous alkali metal hydrosulfites by introducing gaseous sulfur dioxide into an aqueous methanol solution, containing sodium formate and sodium carbonate, at a temperature below 30° C. and then bringing said solution to the temperature at which sodium hydrosulfite formation begins.

However, this process disadvantageously requires a considerable excess of sodium formate to buffer the acidity of the solution so that the formed hydrosulfite is maintained stable during the reaction, because the process involves the addition of the entire amount of the sulfur dioxide at the initial stage. Moreover, the crystals obtained in the process are fine and of low stability. Furthermore, it is necessary for establishing preferred reaction conditions exactly to control the molar ratios of the starting materials. These factors make the process inadequate for industrial operation.

Therefore, production of highly stable and pure hydrosulfite has heretofore been carried out not by the sodium formate process, but by the zinc process. The zinc process comprises reacting expensive zinc powders with sulfur dioxide to yield zinc hydrosulfite, then subjecting the resulting zinc hydrosulfite to double decomposition by caustic soda, concentrating the resulting aqueous solution, and adding ethanol and sodium chloride thereto to precipitate the crystals of the products. The zinc process has the disadvantage that the steps are complicated and the cost of the starting material is quite high.

According to the present invention, anhydrous hydrosulfites of high stability and purity are produced by the use of alkali metal formate such as sodium formate, potassium formate and the like, among them, sodium formate (byproduct may be used) nowadays being available at a low price and most preferable, and the crystals formed are so coarse that only the separation and drying steps are required, but no salting out procedure is required.

Direct introduction of sulfur dioxide into the reaction vessel as in the methods of the prior art would be accompanied by direct contact of fine crystals of the hydrosulfite formed with sulfur dioxide. This contact causes partial decomposition of the surface of the crystals, the decomposition product forming thin film on the surface. Repetition of the crystal growth and the partial decomposition of crystals results in the growth of coarse particles of the product, which are not only impure but also unstable. Therefore, the present invention provides a process comprising adding sulfur dioxide in a form of methanol adduct, that is, in a form of methanol solution in such amount as corresponding to the reaction velocity.

When the entire amount of the sodium formate solution, methanol, and sulfur dioxide, previously placed in a reaction vessel, is reacted with an alkali agent, the produced crystals of hydrosulfite include bisulfite, or precipitate together with bisulfite, because the bisulfite greatly exceeds the hydrosulfite at the stage where the hydrosulfite begins to crystallize out. This causes a decrease in the stability and purity of the product. Moreover, the presence of the entire amount of sulfur dioxide makes the pH of the mixture unnecessarily low so that hydrosulfite is decomposed to form substances which promote further decomposition of the hydrosulfite, said decomposition-promoting substances being included inside the crystals of the product and causing a decrease in the stability and purity. Since the reaction proceeds under such unstable condition, it is difficult to control the stability and purity of the product, and it is necessary to employ a large amount of sodium formate to buffer the solution so that the most stable product is obtained from the process.

According to the process of the present invention, anhydrous alkali metal hydrosulfites of high stability and purity are produced by dropwise adding sulfur dioxide-containing methanol and an alkaline agent to an aqueous solution of an alkali metal formate while heating the reaction mixture under slightly acidic conditions, namely at a pH between 4 and 6.5.

The concentration of the aqueous solution of the alkali metal formate is not particularly limited. Concentrations as low as 40 to 50 weight percent may even be employed.

Also the aqueous solution may contain methanol at a low concentration prior to the addition of the sulfur dioxide containing methanol solution.

The sulfur dioxide-containing methanol and the alkaline agent may be added dropwise in the form of mixture previously prepared, or they may be added separately without mixing them before they are added. The methanol of the sulfur dioxide-containing methanol may be either pure methanol or aqueous methanol containing a small amount of water. The content of the sulfur dioxide in the methanol is preferably 200–300 g. per liter of methanol.

Used as the alkaline agent are alkali metal hydroxides, carbonates, sulfites, etc. Sodium hydroxide is the most preferable.

An example of the preferable solution to be dropwise added is one which is prepared by dropwise adding an alkali metal hydroxide to sulfur dioxide-containing methanol at a temperature below 30° C.

The reaction temperature of alkali metal formate, sulfur dioxide and alkaline agent is maintained within a range between the anhydrous state-hydrate transition point of the hydrosulfite and the reflux temperature of the methanolic solution employed, but any further exact control of temperature is not required just so long as the temperature is within said range. For example, in the case of sodium hydrosulfite, the reaction temperature is preferably maintained at 60–70° C. to directly yield granular crystals of the anhydrous hydrosulfite of purity higher than 90%.

The pH of the reaction solution is preferably maintained at 4–5, being adjusted by an alkaline agent such as alkali metal hydroxides, carbonates, sulfites, etc. Among them, sodium hydroxide is the most preferable. The alkaline agent may be added to the reaction solution either separately or by adding it to the sulfur dioxide-containing methanol to be dropwise added.

According to the present invention, a product of high purity is obtained even when the molar ratios of the starting materials are varied over a wide range such as exemplified below.

Alkalimetal formate (e.g., HCOONa) 60–90 weight parts for 72–110 weight parts of $SO_2$

| | Weight parts |
|---|---|
| Alkaline agent (e.g., NaOH) | 16–40 |
| $H_2O$ | 90–160 |
| $CH_3OH$ | 350–600 |

The inventive method has the advantage that no vigorous stirring is needed and hence there arises no mechanical problem which is generally encountered in larger batches where vigorous stirring is required.

According to the process of the present invention, sulfur dioxide-containing methanol and alkaline agent are dropwise added so that the pH of the reaction solution can be always easily maintained at the optimum condition.

The reactions according to the present invention in generalized form proceed as follows (illustrated in case of hydroxide):

$$HCOOM + H_2O + SO_2 \rightarrow HCOOH + MHSO_3 \quad (1)$$
$$MOH + SO_2 \rightarrow MHSO_3 \quad (2)$$
$$HCOOH + 2MHSO_3 \rightarrow M_2S_2O_4 + CO_2 + H_2O \quad (3)$$

where M is an alkali metal. In these reactions, unreacted alkali metal formate acts as a buffer agent to facilitate smooth reaction (3).

Reaction (3) is not possible in the absence of alkali metal formate, and the concentrations of formic acid and bisulfite are controlled by the addition of sulfur dioxide-methanol and alkali metal hydroxide. The addition of the sulfur dioxide-methanol and alkali metal hydroxide is preferably completed in two to three hours. Since the reactions are carried out from the beginning at high temperature, e.g., 60° to 70° C., the rate of reaction is quite speedy.

Sulfur dioxide-methanol and alkali metal hydroxide are dropwise added at such rate as to correspond to the proceeding of reaction (3), which can be measured, for example, by the evolution of carbon dioxide, so that formic acid and an alkali metal bisulfite are not present in excess. [Reaction (1) or (2) proceeds at a greater rate than reaction (3)].

Since an excess of formic acid causes decomposition of hydrosulfites and consequently lowers the stability of the product, or an excess of bisulfites lowers the purity and stability of hydrosulfites by precipitating together with the product, the above procedure is essential.

It has the advantage that since the initial formation of hydrosulfite in the reaction takes place from the aqueous solution of the alkali metal formate containing methanol in a low concentration the size of the single crystals is large, and since methanol is supplied from the sulphur dioxide-methanol as the concentration of the sodium formate is decreased, the hydrosulfite formed is not subject to partial decomposition, reaction (3) thereby being smoothly effected to produce large crystals of hydrosulfite of high stability and purity.

The invention will now be described in greater detail in conjunction with the following specific examples.

A comparison of stability of the product obtained by the process of the present invention with that of a prior art process, i.e., the method of U.S. Patent 2,010,615 is below given.

(1) In a closed vessel (decomposition of anhydrous sodium hydrosulfite in six months after its production):

| | Percent |
|---|---|
| (a) U.S. Patent 2,010,615 | 5–8 |
| (b) The present invention | 0–1 |

(2) In air (decomposition of anhydrous sodium hydrosulfite in thirty hours):

| | Percent |
|---|---|
| (a) U.S. Patent 2,010,615 | 30–45 |
| (b) The present invention | 3–7 |

In the following examples the parts are by weight.

Example 1

In 470 parts of methanol are absorbed 80 parts of sulfur dioxide. To the resulting solution, maintained at 30° C., there is dropwise added with vigorous stirring from a separatory funnel in 20 min. a solution of 23 parts of sodium hydroxide in 80 parts of water.

A solution of 80 parts of sodium formate in 120 parts of hot water of 70° C. is placed in a reaction vessel equipped with a reflux condenser, separatory funnel and a thermometer. To this solution warmed to 60° C., sulfur dioxide-containing methanol, prepared as above, is dropwise added with stirring the above-described solution in 90 min. After 30 minutes' reaction crystals of hydrosulfite begin to precipitate. On completion of the addition of the solution, refluxing is had at 70° C. for an additional three hours to give white granules of sodium hydrosulfite, which are rapidly sedimented. The crystals are separated by suction filtration, washed with 200 parts of methanol, transferred rapidly to a vacuum dryer and dried at 75° C. and at a pressure below 100 mm. Hg to yield 84 parts of hydrosulfite of 90.5% in purity.

Example 2

In 500 parts of methanol are absorbed 87 parts of sulphur dioxide. To the resulting solution maintained at 30° C., is dropwise added in twenty minutes while stirring a solution of 21 parts of sodium hydroxide in 80 parts water.

To a solution of 90 parts of sodium formate in 160 parts of hot water of 70° C. is dropwise added while stirring the above-described solution in 120 min., while maintaining the temperature at 70° C.

Succeeding steps in the procedure are the same as those in Example 1. There are obtained 90 parts of crystals of hydrosulfite of 91.2% in purity.

Example 3

72 parts of sulphur dioxide are dissolved in 386 parts of methanol and, separately, 20 parts of sodium hydroxide are dissolved in 60 parts of water.

A solution of 70 parts of sodium formate in 76 parts of hot water at 70° C. is placed in a reaction vessel equipped with a reflux condenser, separatory funnel and thermometer, and then heated to 67° to 70° C., thereto the above mentioned two solutions are dropwise added in 120 min. under stirring. The addition is made in such a way that one third of each added solution is initially added in 30 min., the remaining two third being added in 90 min. Formation of hydrosulfite begins 35 min. after commencement of the addition. After completion of the addition of solutions refluxing is had at 70° C. for an additional three hours to produce white granules of anhydrous sodium hydrosulfite which are rapidly sedimented. The crystals are separated by suction filtration, washed with 150 parts of methanol and dried in the same way as in the preceding example. The yield 72 parts of a purity 89%.

Example 4

100 parts of sulphur dioxide are absorbed in 355 parts of methanol and, separately, 30 parts of sodium hydroxide are dissolved in 45 parts of water.

75 parts of sodium formate are dissolved in 55 parts of water at 70° C. and thereto 69 parts of methanol are added. The resulting solution is placed in a reaction vessel provided with a reflux condenser, separatory funnel and a thermometer and heated to 67–70° C., thereto the above mentioned two solutions are dropwise added in a period of 140 minutes under stirring.

The addition is made in such a way that one third of each added solution is initially added in 35 min., the remaining two thirds being added in 115 min.

Formation of hydrosulfite begins in 40 min. after commencement of addition. After completion of the addition of solutions refluxing is had at 70° C. for an additional three hours to produce white granules of sodium hydrosulfite which are rapidly sedimented.

The crystals are separated by suction filtration, washed with methanol and dried in vacuo.

104 parts of the product obtained is of 90.6% purity.

What is claimed is:

1. Process for the production of anhydrous alkali metal hydrosulfite which comprises adding dropwise sulfur dioxide containing methanol and an alkaline agent to an aqueous solution of alkali metal formate, at a temperature, between the anhydrous-hydrate transition point of alkali metal hydrosulfite and the reflux temperature of the reaction mixture and at a pH between 4 and 6.5.

2. The process as set forth in claim 1 in which the alkaline agent is sodium hydroxide and the alkali metal formate is sodium formate.

References Cited

UNITED STATES PATENTS

| | | | |
|---|---|---|---|
| 1,036,705 | 8/1912 | Portheim | 23—116 |
| 1,166,160 | 12/1915 | Portheim | 23—116 |
| 2,010,615 | 8/1935 | Vanderbilt et al. | 23—116 |

OSCAR R. VERTEZ, *Primary Examiner.*

EARL C. THOMAS, *Assistant Examiner.*